United States Patent
Aoki et al.

(10) Patent No.: US 12,434,564 B2
(45) Date of Patent: Oct. 7, 2025

(54) VEHICLE DISPLAY CONTROL DEVICE

(71) Applicant: TOYOTA JIDOSHA KABUSHIKI KAISHA, Toyota (JP)

(72) Inventors: Takayuki Aoki, Toyota (JP); Ryusuke Ohta, Toyota (JP); Daisuke Itagaki, Kasugai (JP); Hitoshi Muraki, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 18/470,677

(22) Filed: Sep. 20, 2023

(65) Prior Publication Data

US 2024/0210694 A1     Jun. 27, 2024

(30) Foreign Application Priority Data

Dec. 21, 2022   (JP) .................. 2022-204868

(51) Int. Cl.
| | | |
|---|---|---|
| *G02B 27/01* | (2006.01) | |
| *B60K 35/28* | (2024.01) | |
| *B60K 35/23* | (2024.01) | |
| *B60K 35/81* | (2024.01) | |

(52) U.S. Cl.
CPC ............ *B60K 35/28* (2024.01); *G02B 27/017* (2013.01); *B60K 35/23* (2024.01); *B60K 35/81* (2024.01); *B60K 2360/176* (2024.01)

(58) Field of Classification Search
CPC .......... G02B 27/017; G02B 2027/0187; G02B 2027/014; B60K 35/00; B60K 35/23; B60K 35/28; B60K 35/81; B60K 2360/176

See application file for complete search history.

(56) References Cited

U.S. PATENT DOCUMENTS

| | | | |
|---|---|---|---|
| 10,503,167 B2* | 12/2019 | Mimura ................. | B60K 35/00 |
| 2010/0164702 A1* | 7/2010 | Sasaki .................... | G02B 27/01 |
| | | | 345/7 |
| 2015/0307094 A1* | 10/2015 | Ito ........................ | B62D 15/025 |
| | | | 701/1 |
| 2019/0220238 A1 | 7/2019 | Amano et al. | |
| 2020/0180519 A1* | 6/2020 | Mori ...................... | B60K 35/26 |
| 2021/0080728 A1* | 3/2021 | Ozawa ............... | G02B 27/0172 |
| 2021/0291653 A1* | 9/2021 | Higashiyama ......... | B60K 35/22 |

FOREIGN PATENT DOCUMENTS

JP    2019-125188 A    7/2019

* cited by examiner

*Primary Examiner* — Richard M Camby
(74) *Attorney, Agent, or Firm* — SoraIP, Inc.

(57) ABSTRACT

A control unit is provided in a wearable terminal mounted on a head of an occupant of a vehicle, and controls a display unit that is positioned immediately before an eye of the occupant when the wearable terminal is mounted on the head and can display a plurality of types of object images, and the control unit decides whether or not to display a specific object image that is a predetermined object image on the display unit based on at least one of information on a line of sight of the occupant and information on a swing of the occupant.

2 Claims, 7 Drawing Sheets

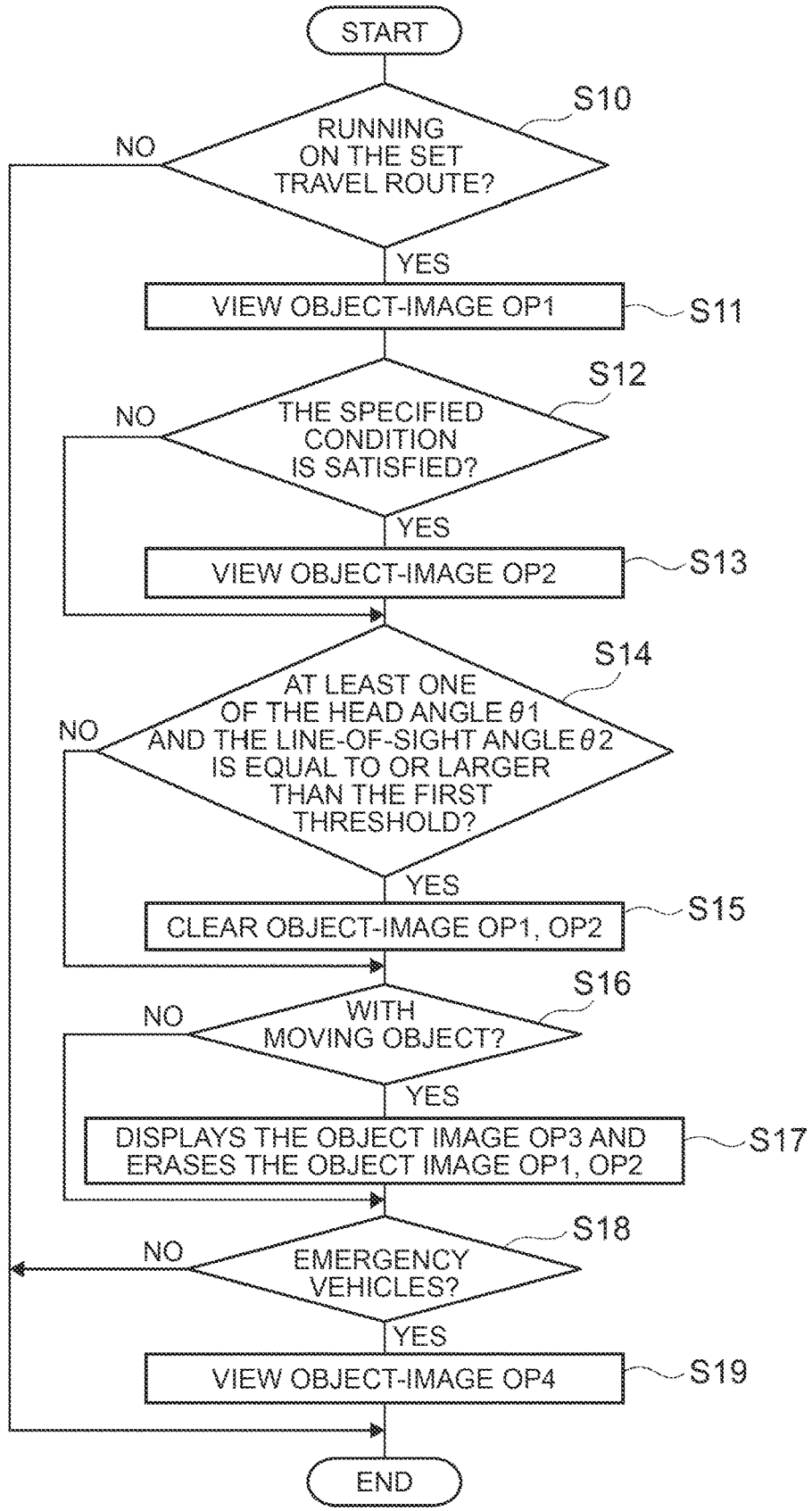

VEHICLE DISPLAY CONTROL DEVICE

CROSS-REFERENCE TO RELATED APPLICATION

This application claims priority to Japanese Patent Application No. 2022-204868 filed on Dec. 21, 2022, incorporated herein by reference in its entirety.

BACKGROUND

1. Technical Field

The disclosure relates to a vehicle display control device.

2. Description of Related Art

Japanese Unexamined Patent Application Publication No. 2019-125188 (JP 2019-125188 A) discloses a wearable terminal mounted on the head of an occupant of a vehicle. The wearable terminal includes a display unit that is positioned directly in front of the eyes of the occupant when mounted on the head, and that is capable of displaying a plurality of types of object images.

SUMMARY

JP 2019-125188 A has room for improvement with respect to appropriately controlling the display unit based on at least one of information regarding line of sight of the occupant, and information regarding neck movement thereof.

In view of the above, it is an object of the disclosure to provide a vehicle display control device that is capable of appropriately controlling a display unit based on at least one of information regarding line of sight of an occupant, and information regarding neck movement thereof.

A vehicle display control device according to a first aspect includes a control unit that is provided in a wearable terminal mounted on the head of an occupant of a vehicle, and that controls a display unit that is positioned directly in front of the eyes of the occupant when the wearable terminal is mounted on the head and that is configured to display a plurality of types of object images.

Based on at least one of information regarding a line of sight of the occupant, and information regarding neck movement of the occupant, the control unit decides whether to display a specific object image that is a predetermined one of the object images on the display unit.

The control unit of the vehicle display control device according to the first aspect controls the display unit that is provided to the wearable terminal and that is capable of displaying the multiple types of object images. Further, the control unit decides whether to display the specific object image, which is the predetermined object image, on the display unit, based on at least one of information regarding the line of sight of the occupant and information regarding neck movement of the occupant. Accordingly, the vehicle display control device according to the first aspect can appropriately control the display unit based on at least one of information regarding the line of sight of the occupant and information regarding neck movement thereof.

As described above, the vehicle display control device according to the disclosure has an excellent advantage, in that the display unit can be appropriately controlled based on at least one of information regarding the line of sight of the occupant and information regarding neck movement thereof.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a flow chart illustrating a process executed by CPU of AR glass.

DETAILED DESCRIPTION OF EMBODIMENTS

Figure 1:
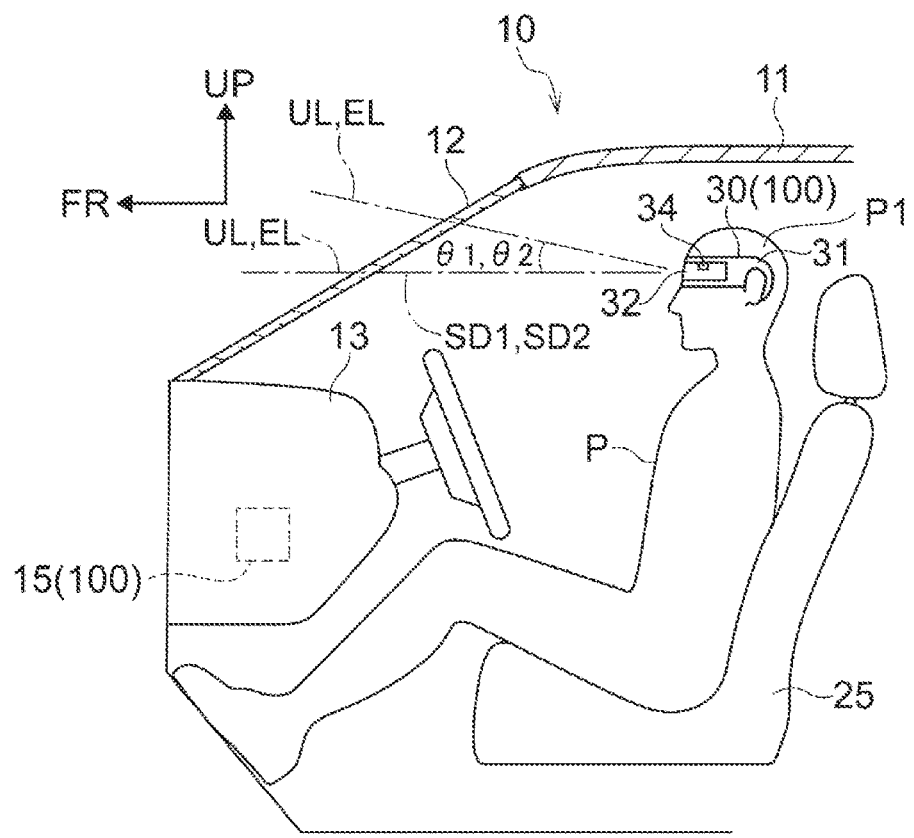
FIG. 1 is a schematic side view illustrating an inside of a vehicle to which a vehicle display control device according to an embodiment is applied.

Hereinafter, an embodiment of a vehicle display control device according to the present disclosure will be described with reference to the accompanying drawings. The vehicle display control device 100 (hereinafter, referred to as the control device 100) of the embodiment is applied to the vehicle 10 and AR glass (wearable terminal) 30. Note that an arrow FR appropriately shown in the drawings indicates the front side of the vehicle which is the front side in the vehicle front-rear direction, an arrow UP indicates the upper side of the vehicle which is the upper side in the vehicle up-down direction, and an arrow LH indicates the left side of the vehicle which is the left side in the vehicle left-right direction (vehicle widthwise direction).

As shown in FIG. 1, the vehicle body 11 of the vehicle 10 is provided with a front windshield 12. Further, the vehicle body 11 is provided with an instrument panel 13, an ECU 15, and a driver's seat 25.

Figure 2:
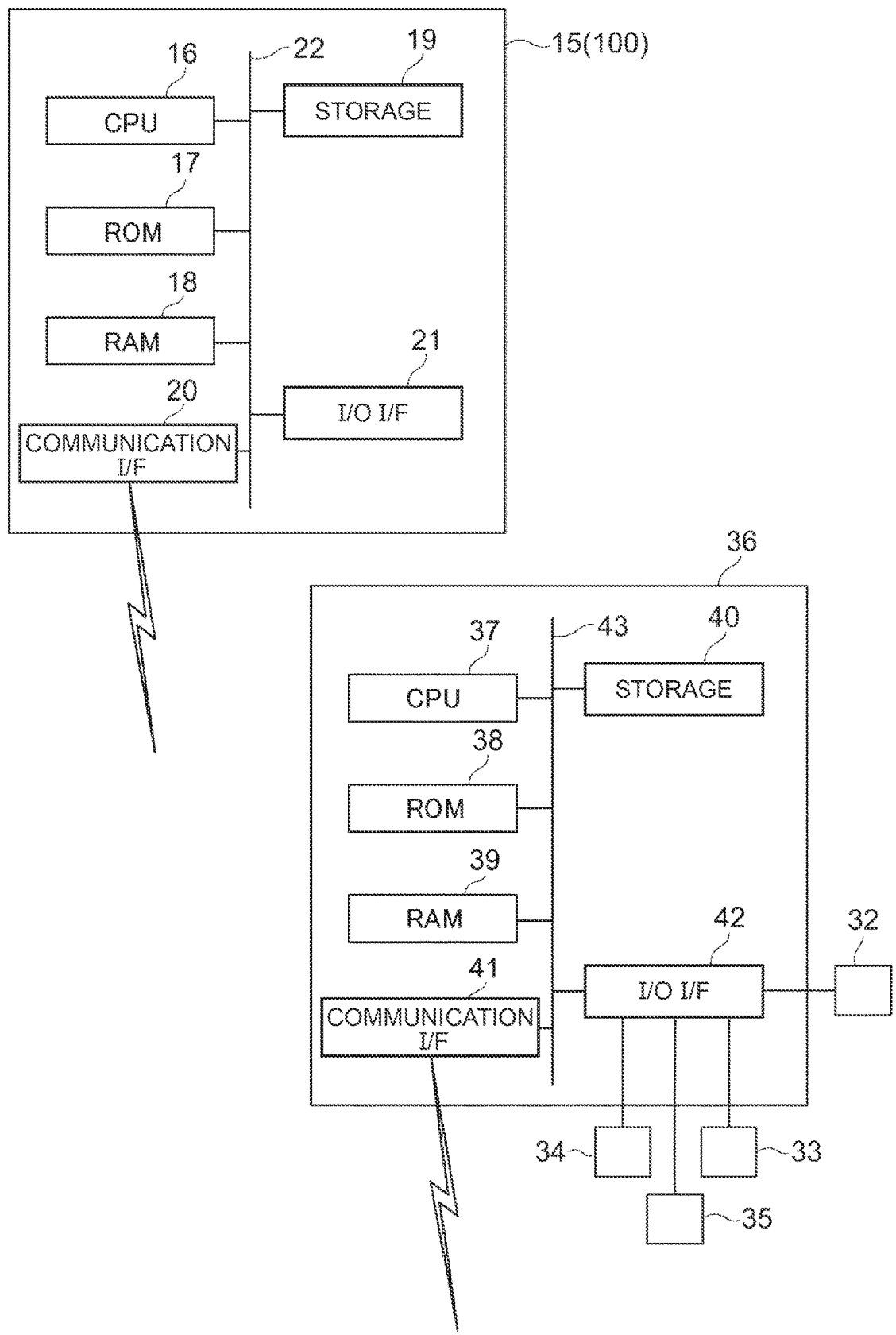
FIG. 2 is a control diagram of the hardware configuration of ECU and AR glasses of vehicles.

As illustrated in FIG. 2, ECU 15 includes a processor (Central Processing Unit) CPU 16, Read Only Memory (ROM) 17, Random Access Memory (RAM) 18, a storage 19, a communication interface (I/F) 20, and an input/output I/F 21. CPU 16, ROM 17, RAM 18, the storage 19, the communication I/F 20, and the input/output I/F 21 are communicably connected to each other via a bus 22. ECU 15 can acquire date and time information from a timer (not shown).

CPU 16 is a central processing unit that executes various programs and controls each unit. That is, CPU 16 reads the program from ROM 17 or the storage 19, and executes the program using RAM 18 as a working area. CPU 16 performs control of respective components and various arithmetic processes (information processing) in accordance with programs recorded in ROM 17 or the storage 19.

ROM 17 stores various programs and various data. RAM 18 temporarily stores a program/data as a working area. The storage 19 is constituted by a storage device such as a Hard Disk Drive (HDD) or a Solid State Drive (SSD), and stores various programs and various data. The communication I/F 20 is an interface capable of communicating with a device located outside the vehicles 10. For example, the communication I/F 20 can wirelessly communicate with AR glass 30. As the communication I/F 20, a communication standard such as Bluetooth (registered trademark) or Wi-Fi (registered trademark) is used. Further, the communication I/F 20 can communicate with an ECU different from ECU 15 provided in the vehicles 10 via an external bus.

As shown in FIG. 1, a AR glass 30, which is a wearable terminal of a head-mounted display type, is mounted on the head P1 of an occupant P seated on the driver's seat 25 of the vehicle 10. AR glass 30 displays contents such as images and characters by superimposing them on an object viewed by the occupant P via AR glass 30 (the display unit 32) or a landscape outside the vehicle using a Augmented Reality (AR) technique. AR glass 30 includes a main body 31, a display unit 32, a line-of-sight sensor 33, a camera 34, an acceleration sensor (IMU sensor) 35, a hardware configuration 36, and a battery (not shown).

The main body 31 is a portion to be attached to the head P1.

The display unit 32 is provided at a front portion of the main body 31. That is, when the main body 31 is mounted on the head P1, the display unit 32 is positioned immediately before both eyes of the occupant P. The display unit 32 is a transmissive display that displays various types of object images (contents, holograms) such as images, characters, and icons visible to the occupant P. In the following explanation, a front portion of the display unit 32 (head P1) is defined as a unit front portion, a left portion of the display unit 32 is defined as a unit left portion, a right portion of the display unit 32 is defined as a unit right portion, an upper portion of the display unit 32 is defined as a unit upper portion, and a lower portion of the display unit 32 is defined as a unit lower portion. Therefore, for example, only when the head P1 faces forward, the vehicle front FR and the unit front coincide with each other, the vehicle left LH and the unit left coincide with each other, and the vehicle upper UP and the unit upper coincide with each other. The occupant P can visually recognize an object or the like in front of the unit through the display unit 32. Furthermore, since the display unit 32 is translucent, the occupant P can visually recognize the scene in front of AR glass 30 through the display unit 32.

The line-of-sight sensor 33 detects the orientation of the line-of-sight EL of the occupant P wearing AR glass 30.

The camera 34 is capable of capturing an image of a subject located in front of the unit and a subject located in the vicinity thereof. That is, the camera 34 is capable of capturing an image of a subject located within a range of its own angle of view.

The acceleration sensor 35 detects the acceleration of AR glass 30 (head P1) on the unit upper side, the unit lower side, the unit left side, and the unit right side.

The battery supplies power to the display unit 32, the line of sight sensor 33, the camera 34, the acceleration sensor 35, and the hardware configuration 36.

As illustrated in FIG. 2, the display unit 32, the line-of-sight sensor 33, the camera 34, and the acceleration sensor 35 are connected to a hardware configuration 36 (input/output I/F 42). The hardware configuration 36 includes a CPU (control unit) 37, a ROM 38, RAM 39, a storage 40, a communication I/F 41, and an input/output I/F 42. CPU 37, ROM 38, RAM 39, the storage 40, the communication I/F 41, and the input/output I/F 42 are communicably connected to each other via a bus 43. The functions of CPU 37, ROM 38, RAM 39, the storage 40, the communication I/F 41, and the input/output I/F 42 are the same as those of CPU 16, ROM 17, RAM 18, the storage 19, the communication I/F 20, and the input/output I/F 21, respectively. ROM 38 or the storage 40 stores a program (application) for displaying the object-image OP1, OP2, OP3, OP4 on the display unit 32.

Various pieces of object information are recorded in the storage 40. The object information includes, for example, an object image (a specific object image) (a first specific object image) OP1, an object image (a specific object image) (a first specific object image) OP2, an object image (a specific object image) OP3, and an object image (a specific object image) (a second specific object image) OP4 shown in FIGS. 4A to 6B. The object image OP1 is an image representing an arrow indicating a direction of a traveling route set by using a navigation system mounted on the vehicle 10. The object image OP2 is an image representing a predetermined advertising content. The object image OP3 is an image representing a position of a moving object moving around the vehicle 10. The moving object includes, for example, a pedestrian, a vehicle, and a bicycle. The object image OP4 is an image indicating that the emergency vehicle including the ambulance and the police vehicle is approaching the vehicle 10. For example, the vehicle 10 (CPU 16) recognizes that the emergency vehicle is approaching the vehicle 10 by analyzing an alarm sound generated by the emergency vehicle by the alarm sound analysis unit mounted on the vehicle 10 or by receiving a radio signal emitted by the emergency vehicle by the radio receiver mounted on the vehicle 10.

Figure 3:
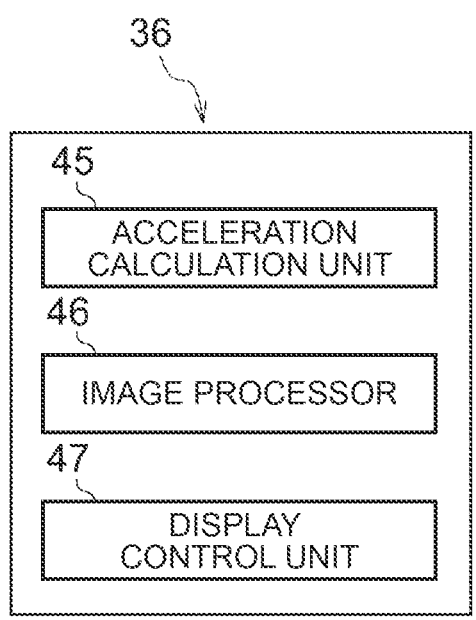
FIG. 3 is a functional diagram of a hardware configuration of a AR glass.

As illustrated in FIG. 3, the hardware configuration 36 of AR glass 30 includes an acceleration-calculation unit 45, an image-processing unit 46, and a display-control unit 47 as functional configurations. The acceleration-calculation unit 45, the image-processing unit 46, and the display-control unit 47 are realized by CPU 37 of the hardware-configuration 36 reading out and executing a program stored in ROM 38 or the storage 40.

The image processing unit 46 performs image processing on the captured data acquired by the camera 34 to determine whether or not the captured data includes a predetermined subject. The predetermined object includes, for example, a traveling route (road) and a moving object that are set using a navigation system. Note that the load of the calculation processing of CPU 37 when the image processing unit 46 performs the image processing is larger than the load of the calculation processing of CPU 37 when the acceleration calculation unit 45 calculates the relative acceleration. Therefore, the image processing unit 46 (CPU 37) executes the image processing every time the first predetermined time, which is a time longer than the first predetermined time, elapses. The first predetermined time is, for example, 1.0 seconds. However, the first predetermined time may be a time of a length different from 1.0 seconds.

The acceleration calculation unit 45 calculates a relative acceleration (hereinafter, referred to as a relative acceleration) of the head P1 with respect to the vehicle 10 based on the acceleration of the head P1 acquired by the acceleration sensor 35. Incidentally, the acceleration calculation unit 45

(CPU 37) calculates the relative acceleration every time the second predetermined period elapses. The second predetermined time is, for example, 1/100 second. However, the second predetermined time may be a time of a length different from 1/100 second.

The display control unit 47 reads the object information from the storage 40 when the predetermined condition is satisfied, and causes the display unit 32 to display the object image OP1, OP2, OP3, OP4 represented by the object information.

As shown in FIG. 1, a straight line extending from the middle of both eyes of the head P1 to the front of the unit and passing through the center of the display unit 32 is defined as a head-direction UL. Further, the head direction UL when the head P1 of the occupant P seated in the driver's seat 25 is directed toward the vehicle front FR of the vehicle and the head direction UL extends toward the front of the unit (horizontally) is referred to as a first reference direction SD1. Further, an angle formed by the head direction UL and the first reference direction SD1 is defined as a head angle $\theta 1$. The head direction UL may change in the left-right direction and the up-down direction, for example. Further, the direction of the line-of-sight EL when the head P1 of the occupant P seated on the driver's seat 25 is directed toward the vehicle front FR side and the line-of-sight EL extends toward the vehicle front FR side (horizontal direction) is referred to as a second reference direction SD2. Further, an angle formed by the line-of-sight EL and the second reference-direction SD2 is defined as a line-of-sight angle $\theta 2$. The line-of-sight EL may change in the left-right direction and the up-down direction, for example. For example, when the head angle $\theta 1$ is zero degrees and the occupant P is looking at the vehicle front FR, the line-of-sight EL extends from the occupant P toward the vehicle front FR. When the head angle $\theta 1$ is zero degrees and the occupant P is looking at the vehicle upper UP, the line-of-sight EL extends from the occupant P to the vehicle upper UP.

Figure 4A:
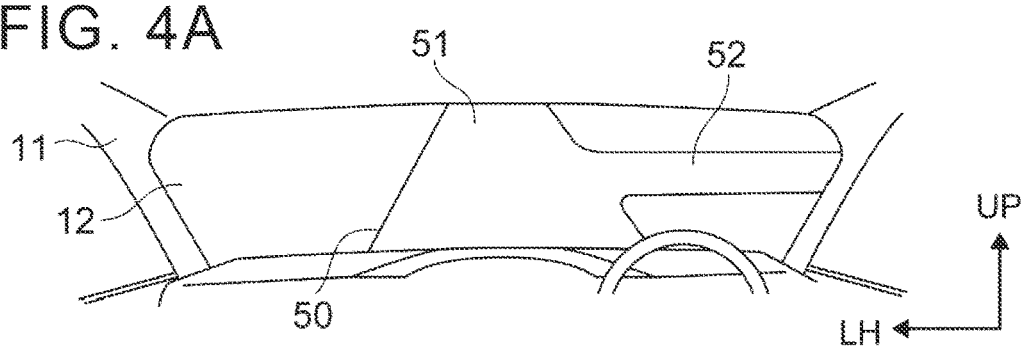
FIG. 4A is a diagram illustrating an object to be viewed by an occupant.

FIG. 4A shows an object to be viewed by the occupant P when the head direction UL is the first reference direction SD1 and the direction of the line-of-sight EL is the second reference direction SD2. The object to be visually recognized at this time includes the front windshield 12 of the vehicle 10, and an object and a landscape on the front FR of the vehicle from the front windshield 12 that is visually recognized by the occupant P through the front windshield 12.

Figure 4B:
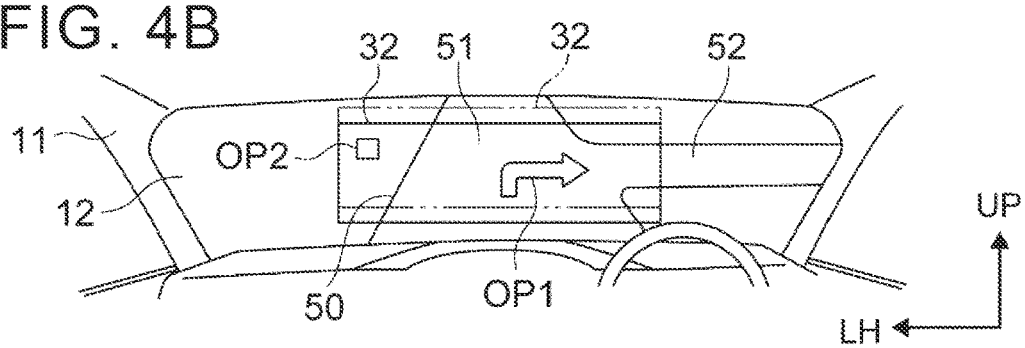
FIG. 4B is a diagram illustrating an object to be viewed by an occupant.

FIG. 4B shows an AR glass 30 mounted on a head P1 in FIG. 1, and a visual object when the head direction UL coincides with the first reference direction SD1 and the direction of the line-of-sight EL coincides with the second reference direction SD2. At this time, the display unit 32 is positioned in front of (immediately before) the unit of the head P1, and the line-of-sight EL passes through the central portion of the display unit 32. The objects to be visually recognized at this time include the display unit 32, the front windshield 12, and objects and scenery on the front FR of the front windshield 12. Further, the occupant P can visually recognize the travel route 50 (see FIGS. 4A to 4E) set by using the navigation system through the display unit 32 and the front windshield 12. The travel route 50 includes a road 51 on which the vehicle 10 is traveling, and a road 52 extending from a part of the road 51 to the right.

For example, in the condition of FIG. 4B, it is assumed that ECU 15 determines that the vehicle 10 is traveling on the travel route 50 based on the map information of the navigation system and the position information of the vehicle 10 acquired by Global Navigation Satellite System (GNSS) receiver mounted on the vehicle 10. At this time, based on the information received from ECU 15, the display control unit 47 determines that the vehicle 10 is traveling in the vicinity of the intersection on the travel route 50. This intersection is a portion where a part of the road 51 and the road 52 intersect. At this time, as shown in FIG. 4B, the display control unit 47 causes the display unit 32 to display the object-image OP1. At this time, the display control unit 47 causes the display unit 32 to display the object image OP1 so that the occupant P recognizes that the object image OP1 is superimposed on the intersection of the travel route 50 recognized by the image processing unit 46. The display position of the object image OP1 in the display unit 32 is the set display position of the object image OP1.

Furthermore, the display control unit 47 causes the display unit 32 to display the object-image OP2 as shown in FIG. 4B while the predetermined condition is satisfied. For example, when the display control unit 47 determines that the vehicle 10 is stopped on the basis of the detection value of the vehicle speed sensor provided in the vehicle 10, the object-image OP2 is displayed on the display unit 32. At this time, the object-image OP2 is displayed in a predetermined area of the display unit 32. For example, the predetermined area is the upper left corner of the display unit 32. This position is a set-display position of the object-image OP2.

When the head P1 faces a direction other than the front FR of the vehicle, the head angle $\theta 1$ becomes larger than zero even if the direction of the line-of-sight EL is any direction. For example, when the head direction UL moves upward from the first reference direction SD1, the display unit 32 (AR glass 30) moves upward with respect to the driver's seat 25 by a distance corresponding to the size of the head angle $\theta 1$, as indicated by a virtual line in FIG. 4B.

Figure 4C:
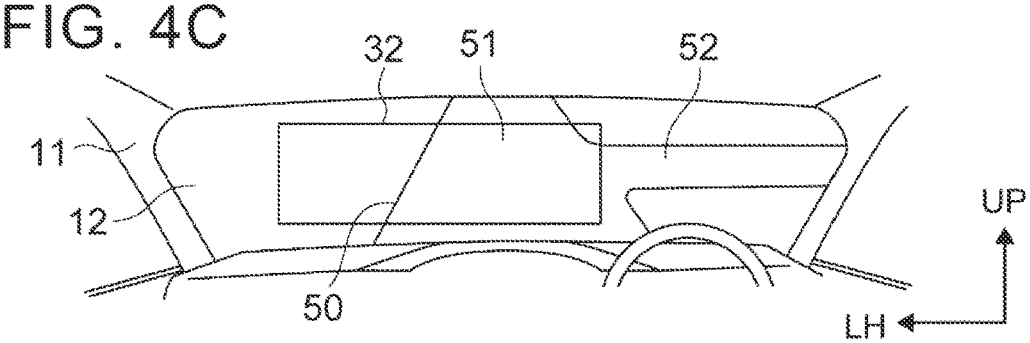
FIG. 4C is a diagram illustrating an object to be viewed by an occupant.

For example, in the condition shown in FIG. 4B, when the head direction UL is moved to the left side from the first reference direction SD1, as shown in FIG. 4C, the display unit 32 (AR glass 30) is moved to the left side from the position shown in FIG. 4B by a distance corresponding to the size of the head angle $\theta 1$. Further, when the head angle $\theta 1$ is equal to or larger than the first threshold value, the display unit 32 controlled by the display control unit 47 deletes the object-image OP1, OP2. In other words, when the display control unit 47 determines that the occupant P is not visually recognizing the object image OP1, OP2, the object image OP1, OP2 is deleted from the display unit 32. In this case, it is highly likely that the consciousness of the occupant P is directed in a predetermined direction (for example, the vehicle left LH side) that differs from the vehicle front FR side. That is, in this situation, it is more likely that the occupant P is more important in the act of turning the consciousness toward the predetermined direction than in the act of visually recognizing the object-image OP1, OP2. Since the object-image OP1, OP2 is deleted from the display unit 32, the occupant P is likely to concentrate on the action of directing consciousness in a predetermined direction.

Figure 4D:
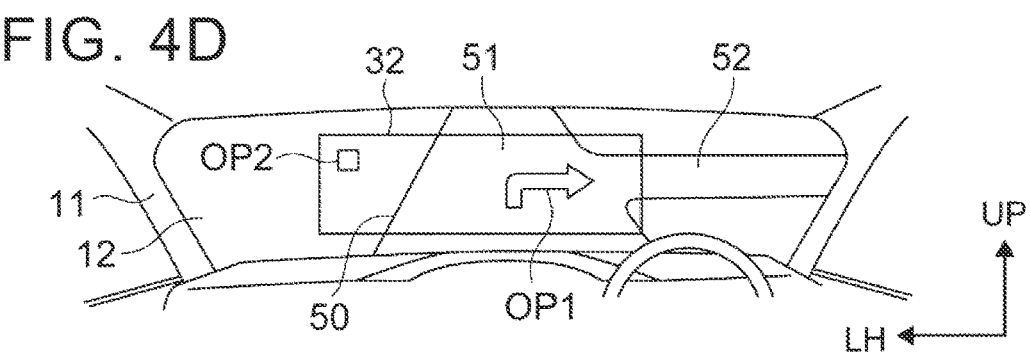
FIG. 4D is a diagram illustrating an object to be viewed by an occupant.
Figure 4E:
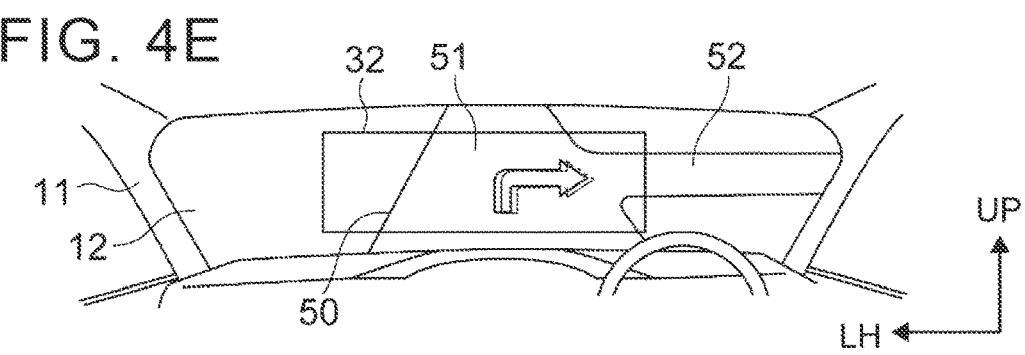
FIG. 4E is a diagram illustrating an object to be viewed by an occupant.

On the other hand, in the condition of FIG. 4B, when the direction of the head P1 is changed so that the head angle $\theta 1$ is smaller than the first threshold value and larger than the second threshold value smaller than the first threshold value, the display unit 32 controlled by the display control unit 47 changes the display position of the object image OP1 in the display unit 32 by using the processing result of the image processing unit 46 while the object image OP2 is displayed at the set display position. That is, as shown in FIG. 4D, the display control unit 47 moves the object image OP1 on the display unit 32 so that the object image OP1 is superimposed on a predetermined portion of the travel route 50 recognized by the image processing unit 46. The position adjustment processing of the object image using the processing result of the image processing unit 46 will be referred to as a first adjustment processing in the following description. The first adjustment process can be executed every first predetermined time.

Further, when the head angle θ1 is less than the first threshold value and greater than the second threshold value, the display control unit 47 adjusts the display position of the object-image OP1 in the display unit 32 based on the relative acceleration. Hereinafter, the position adjustment of the object image based on the relative acceleration is referred to as a second adjustment process. The second adjustment process can be executed every second predetermined time. By this second adjusting process, the position of the object-image OP1 in the display unit 32 is moved to the position opposite to the position of the relative-acceleration. That is, as shown FIG. 4D, the position of the object-image OP1 in the display unit 32 is moved to the right by the second adjusting process.

In this way, by the first adjustment processing and the second adjustment processing, the position of the object-image OP1 in the display unit 32 is brought close to the position overlapping with the predetermined part. Since the first thresholds are small, the occupant P is likely to recognize that the object-image OP1 whose position has been adjusted by the first adjustment process and the second adjustment process is superimposed on a predetermined portion.

Here, in the condition shown in FIG. 4B, it is assumed that the display control unit 47 determines that the vibration has occurred in the head P1 within the second threshold value or less in which the head angle θ1 is smaller than the first threshold value based on the relative acceleration. In this case, the object-image OP1 is moved on the display unit 32 by an amount corresponding to the oscillation amount by the first adjustment process and the second adjustment process, as indicated by a virtual line in FIG. 4E. Therefore, it is highly likely that the occupant P recognizes that the position-adjusted object-image OP1 is superimposed on a predetermined portion.

When the orientation of the head P1 is changed such that the head direction UL completely or almost coincides with the first reference direction SD1 at this time, the display unit 32 returns to the condition shown in FIG. 4B.

Figure 5A:
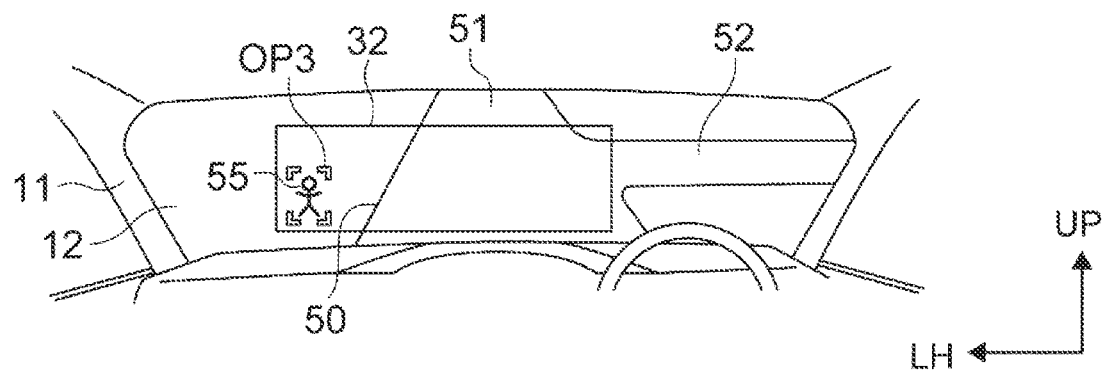
FIG. 5A is a diagram illustrating an object to be viewed by an occupant.

Next, as shown in FIG. 5A, it is assumed that the moving object 55 located diagonally ahead of the vehicle 10 moves to the right. At this time, in order to visually recognize the moving object 55, the occupant P turns the head P1 to the left while changing the head angle θ1 by the first threshold or more. In this case, the display unit 32 moves to the left side as compared with the case of FIG. 4B, and the left end portion of the display unit 32 overlaps with the moving object 55. Further, the display control unit 47 causes the display unit 32 to display the object image OP3 so as to be superimposed on the area around the moving object 55 recognized by the image processing unit 46 using the pattern matching method or the like. The display position of the object image OP3 is the setting display position of the object image OP3. When the moving object 55 further moves, the setting-display position of the object-image OP3 changes to a position overlapping with a region around the moving object 55 by the first adjusting process.

At this time, since the head angle θ1 is equal to or larger than the first threshold value, the object-image OP1, OP2 is deleted from the display unit 32 as shown in FIG. 5A. Therefore, the occupant P can concentrate his/her consciousness on the act of visually recognizing the moving object 55, which is an act of higher importance than the act of visually recognizing the object-image OP1, OP2.

When the head angle θ1 changes, the first adjustment process and the second adjustment process are performed on the object-image OP3 regardless of the size of the head angle θ1.

Figure 5B:
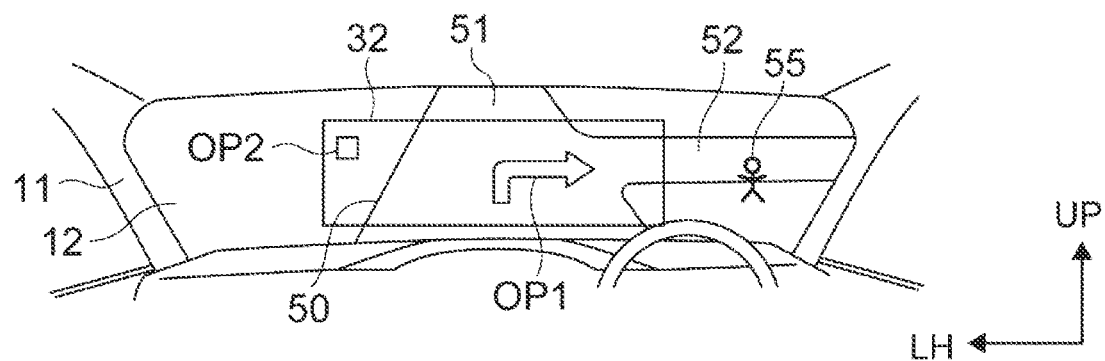
FIG. 5B is a diagram illustrating an object to be viewed by an occupant.

In FIG. 5B shown in the drawing, the moving object 55 moves to the right side of the road 51. That is, FIG. 5B shows that the traversing operation of the road 51 by the moving object 55 is completed. At this time, the occupant P does not need to visually recognize the moving object 55. Therefore, as shown in FIG. 5B, the head direction UL coincides with the first reference direction SD1. Therefore, the display unit 32 controlled by the display control unit 47 again displays the object-image OP1, OP2 at the respective setting display positions.

Figure 5C:
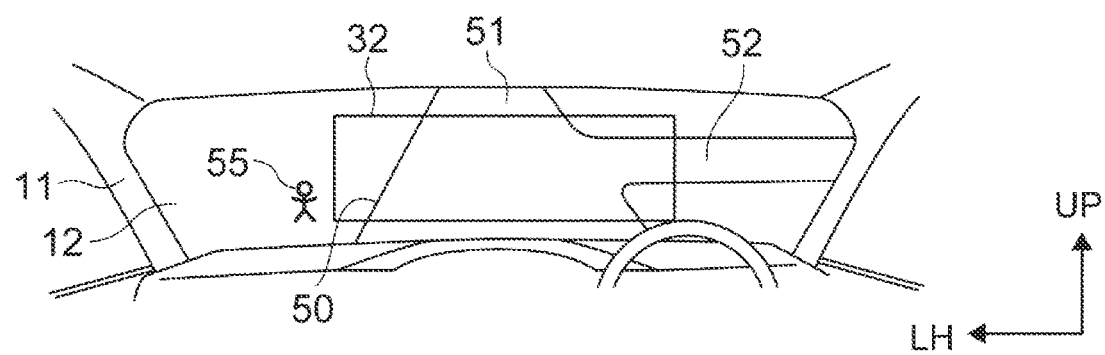
FIG. 5C is a diagram illustrating an object to be viewed by an occupant.

As shown in FIG. 5C, when the head direction UL and the first reference direction SD1 coincide with each other, the occupant P may visually recognize the moving object 55 by moving the line-of-sight EL leftward from the second reference direction SD2. That is, the occupant P may visually recognize the moving object 55 while the line-of-sight angle θ2 is made to be equal to or larger than the first threshold value. In this case, the display control unit 47 determines that the occupant P is visually recognizing the moving object 55 on the basis of the imaging data of the camera 34 and the detection value of the line-of-sight sensor 33. Further, since the line-of-sight angle θ2 is larger than or equal to the first threshold, the object-image OP1, OP2 is deleted from the display unit 32. When the moving object 55 moving to the right side overlaps with a part of the display unit 32, the object-image OP3 is displayed on the display unit 32.

Figure 6A:
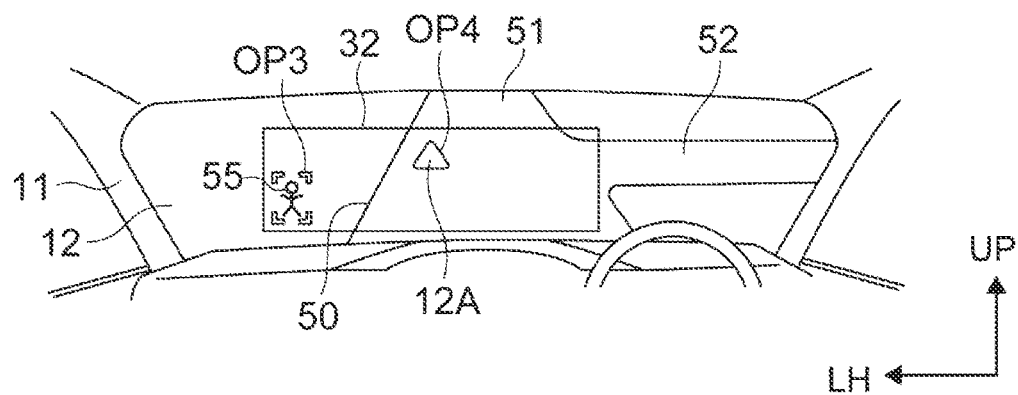
FIG. 6A is a diagram illustrating an object to be viewed by an occupant.
Figure 7:
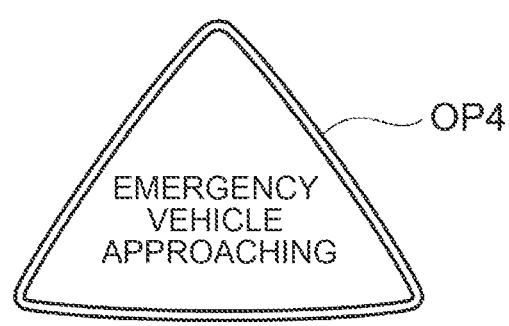
FIG. 7 is an enlarged view of an object-image.

It is further assumed here that, in the condition shown in FIG. 4B, the moving object 55 (not shown in FIG. 4B) located diagonally ahead of the left of the vehicle 10 moves to the right, and the urgent vehicle (not shown) approaches the vehicle 10. At this time, it is assumed that the head angle θ1 becomes equal to or larger than the first threshold value when the head P1 faces the vehicle left LH side. Therefore, as shown in FIG. 6A, the left end portion of the display unit 32 overlaps with the moving object 55. Further, the object-image OP3 is displayed on the display unit 32 so that the occupant P recognizes that the object-image is superimposed on the area around the moving object 55. Further, the display control unit 47 causes the display unit 32 to display the object-image OP4. As shown in FIG. 7, the object-image OP4 includes the letter "emergency-vehicle approaching." Therefore, the occupant P who visually recognizes the object-image OP4 recognizes that the urgent vehicle approaches the vehicle 10. Further, at this time, the display control unit 47 causes the display unit 32 to display the object image OP4 so that the object image OP4 is superimposed on the predetermined part 12A of the front windshield 12. The display position of the object image OP4 is the setting display position of the object image OP4. Further, when the head angle θ1 changes, the first adjustment process and the second adjustment process are performed on the object-image OP4 regardless of the size of the head angle θ1.

Even when the object image OP3 is displayed on the display unit 32 as described above, the object image OP4 is not erased from the display unit 32. In other words, the object image OP4 continues to be displayed on the display unit 32 regardless of whether or not the occupant P is viewing the object image OP4. Therefore, even when the moving object 55 (object image OP3) is visually recognized, the occupant P can visually recognize the object image OP4 representing the highly important information.

When the object-image OP4 is displayed on the display unit 32, a speaker (not shown) provided in the vehicle 10 may output a sound for notifying the approaching of the urgent vehicle.

Figure 6B:
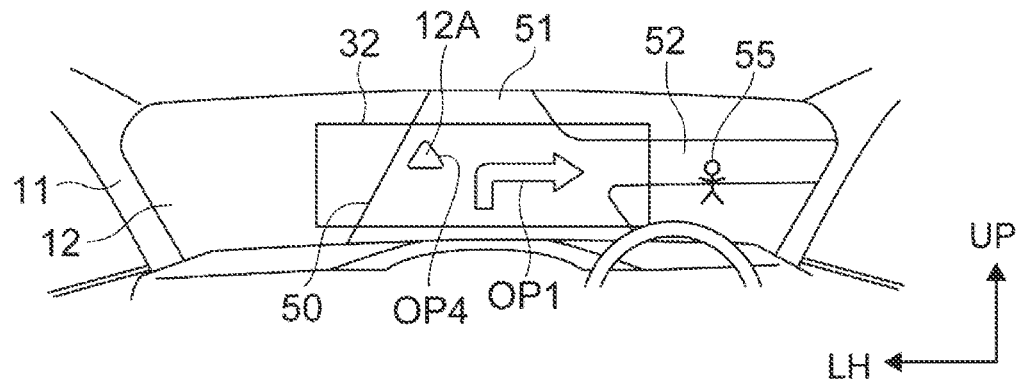
FIG. 6B is a diagram illustrating an object to be viewed by an occupant.

In FIG. 6B, the moving object 55 moves to the right side of the road 51. At this time, the occupant P does not need to visually recognize the moving object 55. Therefore, as shown in FIG. 6B, the head direction UL coincides with the first reference direction SD1. Further, if the vehicle 10 (CPU 16) recognizes that the emergent vehicle is approaching the vehicle 10, the object-image OP4 continues to be displayed on the display unit 32.

ECU 15 and AR glass 30 in the above-described configurations are components of the control device 100 of the present embodiment.

Action and Effect

Next, the operation and effects of the embodiment will be described.

The flow of the process performed by CPU 37 of AR glass 30 will be described below with reference to the flow chart of FIG. 8. CPU 37 repeatedly executes the process of the flow chart of FIG. 8 every time a predetermined period of time elapses. It is assumed that head P1 is equipped with AR glass 30 and that ECU 15 communication I/F 20 and AR glass 30 perform radio communication.

First, in S10, CPU 37 determines whether or not the vehicles 10 are traveling on the set travel route 50.

In CPU 37 where Yes is determined by S10, the process proceeds to S11, and the object-image OP1 is displayed on the display unit 32, and the first adjustment process and the second adjustment process are executed as needed.

In a CPU 37 where S11 process is completed, the process proceeds to S12, and it is determined whether or not a predetermined condition is satisfied. For example, when the vehicles 10 are stopped, CPU 37 determines Yes in S12.

In a CPU 37 where S12 is determined to be Yes, the process proceeds to S13, and the object-image OP2 is displayed on the display unit 32.

In a CPU 37 where S13 process is completed, the process proceeds to S14 to determine whether at least one of the head angle θ1 and the line-of-sight angle θ2 is equal to or greater than the first threshold.

In CPU 37 where S14 is determined to be Yes, the process proceeds to S15, and the display unit 32 deletes the object-image OP1, OP2. The display unit 32 deletes the object image OP1 when the object image OP1 is displayed and the object image OP2 is not displayed on the display unit 32. Further, the display unit 32 erases the object image OP2 when the object image OP2 is displayed and the object image OP1 is not displayed on the display unit 32. When the object-image OP1, OP2 is not displayed on the display unit 32, the display unit 32 remains as it is.

In a CPU 37 where S15 process is completed, the process proceeds to S16, and it is determined whether or not there is a moving object 55 that overlaps with the display unit 32.

In CPU 37 where Yes is determined by S16, the process proceeds to S17, and the object-image OP3 is displayed on the display unit 32, and the first adjustment process and the second adjustment process are executed as needed. Further, CPU 37 performs the same process as S15 in S17.

After S17 process, CPU 37 proceeds to S18 to determine whether or not the urgent vehicle is approaching the vehicle 10.

In CPU 37 where Yes is determined by S18, the process proceeds to S19, and the object-image OP4 is displayed on the display unit 32, and the first adjustment process and the second adjustment process are executed as needed.

In a CPU 37 where the processing of S19 is completed, the processing of the flow chart of FIG. 8 is temporarily ended.

As described above, CPU 37 of the control device 100 according to the embodiment controls the display unit 32 capable of displaying a plurality of types of object-image OP1, OP2, OP3, OP4. Further, CPU 37 decides whether or not the object-image OP1, OP2, OP3, OP4 is displayed on the display unit 32 based on at least one of the information on the line-of-sight EL of the occupant P and the information on the head-direction UL (swing of the occupant P). Therefore, CPU 37 can appropriately control the display unit 32 based on at least one of the information on the line-of-sight EL and the information on the head-direction UL.

Further, when the control device 100 determines that the occupant P does not visually recognize the object image OP1, OP2 displayed on the display unit 32, it deletes the object image OP1, OP2 from the display unit 32. The object image OP1, OP2 is an object image that is less required to be visually recognized by the occupant P. Therefore, the control device 100 can prevent the object image OP1, OP2 from being displayed on the display unit 32 when the occupant P does not visually recognize the object image OP1, OP2. Therefore, the computational burden of CPU 37 is reduced as compared with the case where the object-image OP1, OP2 is continuously displayed on the display unit 32 in such a case. Further, when at least one of the head angle θ1 and the line-of-sight angle θ2 is less than the first threshold value, the first adjustment process and the second adjustment process are executed with respect to the object image OP1 displayed on the display unit 32, but there is a possibility that the object image OP1 is not accurately superimposed on a predetermined portion on the travel route 50 depending on the vehicle speed and the magnitude of the vibration of the vehicle 10 and the manner of the swing of the head P1. It is not preferable that the object-image OP1 is continuously displayed on the display unit 32 without being superimposed on the predetermined part. However, in the present embodiment, when it is determined that the occupant P is not visually recognizing the object-image OP1, OP2 displayed on the display unit 32, there is no possibility that this is caused.

Further, when the control device 100 determines that the occupant P is visually recognizing the moving object 55, which is a predetermined object located in the vicinity of the vehicle 10, erases the object-image OP1, OP2 from the display unit 32. Therefore, the occupant P can concentrate on the act of visually recognizing the moving object 55 (object image OP3) that needs to be visually recognized more than the object image OP1, OP2.

The control device 100 of the embodiment continues to display the object image OP4 displayed on the display unit 32 on the display unit 32 regardless of whether or not the occupant P is viewing the object image OP4. The object image OP4 is an object image having a large necessity of being visually recognized by the occupant P. Therefore, the control device 100 continues to display the object image OP4, which is highly necessary for the occupant P to visually recognize, on the display unit 32 regardless of whether the occupant P is visually recognizing the object image OP4.

Although the control device 100 according to the embodiment has been described above, the design of the control device 100 can be appropriately changed without departing from the gist of the present disclosure.

For example, the line-of-sight EL of the occupant P may be detected using a line-of-sight detecting camera (not shown) provided inside the vehicle 10.

The acceleration-sensor 35 may be omitted from AR glass 30.

What is claimed is:

1. A vehicle display control device, comprising a control unit that is provided in a wearable terminal mounted on a head of an occupant of a vehicle, and that controls a display unit that is positioned directly in front of eyes of the occupant when the wearable terminal is mounted on the head and that is configured to display a plurality of types of object images, wherein, based on at least one of information regarding a line of sight of the occupant, and information regarding neck movement of the occupant, the control unit decides whether to display a specific object image that is a predetermined one of the object images on the display unit, wherein, when determining that the occupant visually recognizes a predetermined object located in a vicinity of the vehicle, the control unit deletes, from the display unit, a first specific object image that is displayed on the display unit, and that is included in the specific object image.

2. A vehicle display control device, comprising:
   a processor provided in a wearable terminal mounted on a head of an occupant of a vehicle; and
   a transmissive display positioned directly in front of eyes of the occupant and provided in the wearable terminal,
   wherein the processor is configured to:
   display a plurality of types of object images on the transmissive display in a case where the wearable terminal is mounted on the head of the occupant;
   based on at least one of information regarding a line of sight of the occupant, and information regarding neck movement of the occupant, decide whether to display a specific object image that is a predetermined one of the object images on the transmissive display; and
   delete, from the transmissive display, a first specific object image included in the specific object image that is displayed on the transmissive display, in a case where the processor determines that the occupant visually recognizes a predetermined object located in a vicinity of the vehicle.

* * * * *